United States Patent
Kim et al.

(10) Patent No.: US 7,957,338 B2
(45) Date of Patent: Jun. 7, 2011

(54) APPARATUS AND METHOD FOR PROVIDING DATA SERVICE IN PORTABLE TERMINAL

(75) Inventors: Eui-Joon Kim, Suwon-si (KR); Doo-Yoel Kam, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 900 days.

(21) Appl. No.: 11/834,397

(22) Filed: Aug. 6, 2007

(65) Prior Publication Data

US 2008/0139215 A1 Jun. 12, 2008

(30) Foreign Application Priority Data

Dec. 11, 2006 (KR) ........................ 10-2006-0125529

(51) Int. Cl.
*H04W 4/00* (2009.01)
*H04Q 7/20* (2006.01)
(52) U.S. Cl. ...................... 370/328; 370/310; 455/452.1
(58) Field of Classification Search .................. 370/328, 370/310, 329, 335, 342; 455/73, 403, 422.1, 455/450, 452.1, 550.1, 572, 574

See application file for complete search history.

(56) References Cited

U.S. PATENT DOCUMENTS

| | | | | |
|---|---|---|---|---|
| 7,373,146 B2* | 5/2008 | Kong et al. | ................ | 455/426.1 |
| 7,536,451 B2* | 5/2009 | Ahn et al. | ..................... | 709/223 |
| 7,599,718 B2* | 10/2009 | Kim | .............................. | 455/574 |
| 2004/0037222 A1* | 2/2004 | Kim et al. | ...................... | 370/229 |
| 2005/0047399 A1* | 3/2005 | Lee et al. | ....................... | 370/352 |
| 2006/0050676 A1* | 3/2006 | Mansour | ....................... | 370/342 |
| 2006/0182069 A1* | 8/2006 | Yu | ................................. | 370/335 |
| 2007/0123206 A1* | 5/2007 | Satake et al. | ................. | 455/403 |
| 2008/0075039 A1* | 3/2008 | Srinivas et al. | ............... | 370/329 |

* cited by examiner

*Primary Examiner* — Chi H Pham
*Assistant Examiner* — Robert Lopata
(74) *Attorney, Agent, or Firm* — The Farrell Law Firm, P.C.

(57) ABSTRACT

Provided are a method and an apparatus for providing a high-speed data service in a portable terminal which supports a 1X-Evolution Data Only (EVDO) system. The method includes if an access to an EVDO data service is performed, setting whether a voice service is to be used; and determining whether a 1X paging channel is to be searched during the access to the EVDO data service, according to the set result. Thus, the portable terminal can set a communication mode during the access to the EVDO data service to enter a mode, which supports only the EVDO data service, without searching for a 1X paging channel.

7 Claims, 3 Drawing Sheets

APPARATUS AND METHOD FOR PROVIDING DATA SERVICE IN PORTABLE TERMINAL

PRIORITY

This application claims priority under 35 U.S.C. §119 to an application entitled "Apparatus and Method for Providing Data Service in Portable Terminal" filed in the Korean Intellectual Property Office on Dec. 11, 2006 and assigned Ser. No. 2006-125529, the contents of which are incorporated herein by reference.

BACKGROUND OF THE INVENTION

1. Field of the Invention

The present invention relates generally to an apparatus and a method for providing a data service in a portable terminal, and in particular, to an apparatus and a method for allowing a portable terminal, which supports Code Division Multiple Access (CDMA) 2000 1X-Evolution Data Only (EVDO), to operate in a mode, which supports only an EVDO data service, when using the EVDO data service, so as to improve data receipt efficiency.

2. Description of the Related Art

Code Division Multiple Access (CDMA) 2000 1X-Evolution Data Only (EVDO) (1X-EVDO) refers to a protocol which is different from an IS-2000 wireless protocol of an existing CDMA 2000 1X (1X) and is necessary for transmitting high-speed packet data. According to the CDMA 2000 1X-EVDO, data can be transmitted forward at a highest speed of about 2.4576 Mbps but backward at a highest speed of only about 153.6 Kbps. The 1X-EVDO requires a Base Station (BS) apparatus separate from an IS-2000 BS apparatus of the 1X and shares other system and network components with the IS-2000 wireless protocol.

A portable terminal, which supports the 1X-EVDO, may operate in a data only mode in which only a high-speed packet data service is performed and a hybrid mode in which the high-speed packet data service and a voice service are performed. However, most 1X-EVDO portable terminals which have been developed operate in the hybrid mode.

FIG. 1 is a flowchart of a process of using an EVDO data service in a conventional portable terminal which operates in a hybrid mode.

Referring to FIG. 1, in step 101, the conventional portable terminal determines if an access to an EVDO data service has been performed. If it is determined in step 101 that the access to the EVDO data service has been performed, the conventional portable terminal proceeds to step 103 to periodically search for a 1X paging channel so as to determine if a voice service signal thereof has been generated during the access to the EVDO data service. In step 105, the conventional portable terminal determines if the voice service signal thereof, i.e., a voice call or a short message service (SMS), has been generated. If it is determined in step 105 that the voice service signal has not been generated, the conventional portable terminal goes to step 111. If it is determined in step 105 that the voice service signal has been generated, the conventional portable terminal proceeds to step 107 to pause the EVDO data service and receive the voice service signal which has been generated through the 1X paging channel.

In step 109, the conventional portable terminal resumes the EVDO data service. In step 111, the conventional portable terminal determines if an event for stopping the access to the EVDO data service has occurred. If it is determined in step 111 that the event has not occurred, the conventional portable terminal returns to step 103 to repeat steps subsequent to step 103. If it is determined in step 111 that the event has occurred, the conventional portable terminal ends the process.

As described above, a conventional portable terminal basically operates in a hybrid mode. Thus, when the conventional portable terminal accesses an EVDO data service, the terminal searches for a 1X paging channel at predetermined time intervals according to 1X slot periods. As a result, the conventional portable terminal supports the EVDO data service and a voice service. However, receiving EVDO data stops for the periodical time required for searching for the 1X pacing channel during the access to the EVDO data service. Thus, the entire data receipt efficiency is lowered. Also, since the conventional portable terminal basically operates in the hybrid mode, the conventional portable terminal searches for the 1X paging channel to receive the voice service even if a user desires to use only the EVDO data service. Thus, this may disturb the user to use the EVDO data service. For example, when the user downloads pay data content, a voice call or an SMS may be received, and thus downloading the pay data content may stop.

SUMMARY OF THE INVENTION

An aspect of the present invention is to substantially solve at least the above problems and/or disadvantages and to provide at least the advantages below. Accordingly, an aspect of the present invention is to provide a method and an apparatus for providing an Evolution Data Only (EVDO) service in a portable terminal which supports Code Division Multiple Access (CDMA) 2000 1X-EVDO.

Another aspect of the present invention is to provide a method and an apparatus for entering a mode, which supports only an EVDO data service, to improve data receipt efficiency when using the EVDO data service in a portable terminal which supports CDMA 2000 1X-EVDO.

The above aspects are achieved by providing a point-to-point emulation apparatus and method in a broadband wireless communication system.

According to one aspect of the present invention, there is provided a method of providing a high-speed data service in a portable terminal, which supports a 1X EVDO system, including, if an access to an EVDO data service is performed, setting whether a voice service is to be used; and determining if a 1X paging channel is to be searched during the access to the EVDO data service, according to the set result.

According to another aspect of the present invention, there is provided an apparatus for providing a high-speed data service in a portable terminal, which supports a 1X-EVDO system, including, if an access to an EVDO data service is performed, a controller requesting a user to set whether a voice service is to be used and outputting the set result to a wireless communicator; and the wireless communicator determining if a 1X paging channel is to be searched during the access to the EVDO data service, according to the set result.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and an apparatus for entering a mode, which supports only an Evolution Data Only (EVDO) data service, to improve data receipt efficiency and exclude external interference when using the EVDO data service in a portable terminal which supports Code Division Multiple Access (CDMA) 2000 1X-EVDO.

Figure 1:
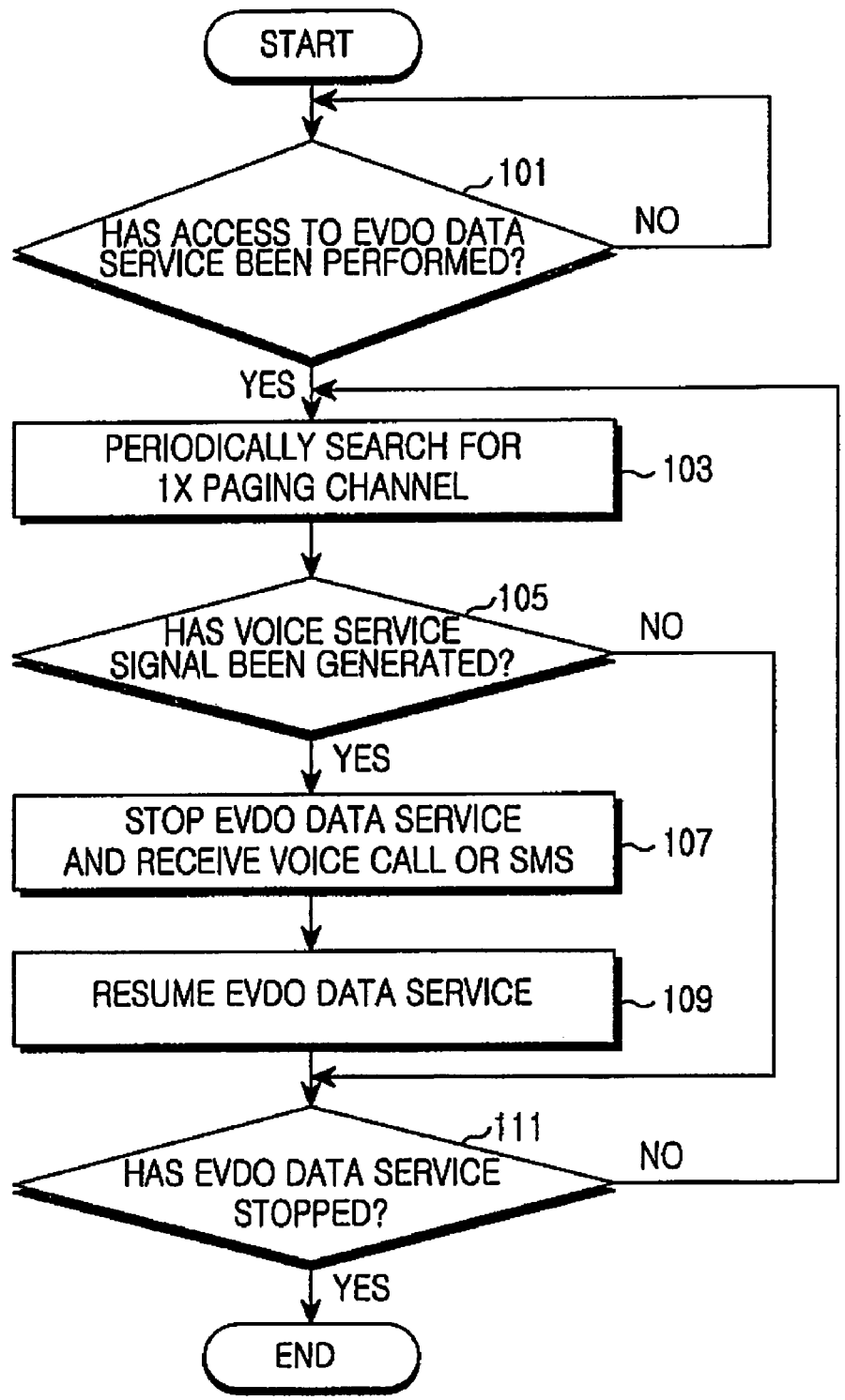
FIG. 1 is a flowchart of a Evolution Data Only (EVDO) data service in a conventional portable terminal which operates in a hybrid mode.
Figure 2:
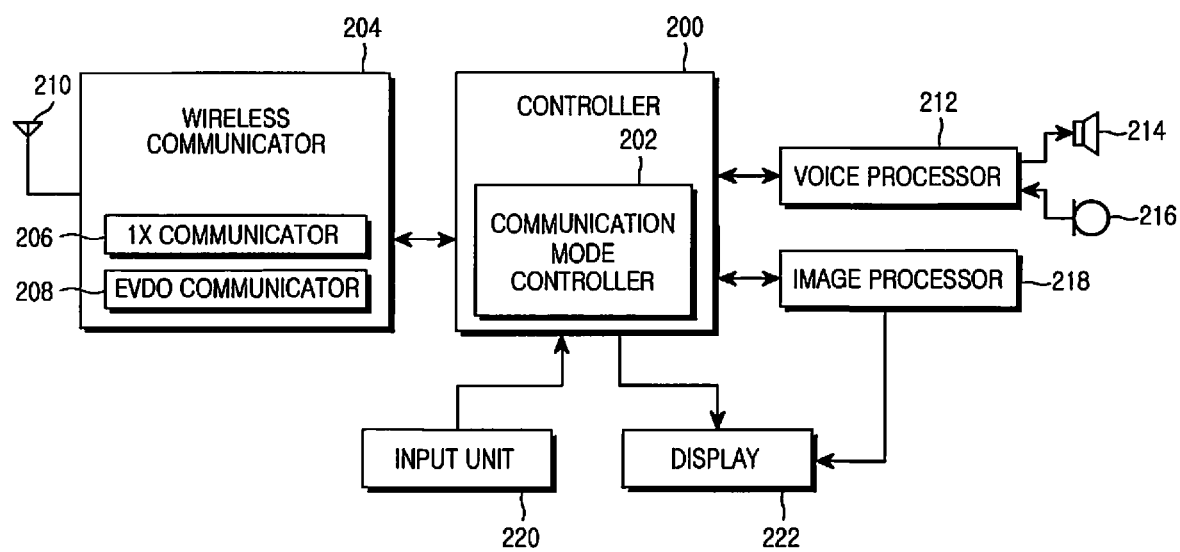
FIG. 2 is a block diagram of a portable terminal according to the present invention.

FIG. 2 is a block diagram of a portable terminal according to the present invention. Referring to FIG. 2, the portable terminal includes a controller 200, a wireless communicator 204, an antenna 210, a voice processor 212, a speaker 214, a microphone 216, an image processor 218, an input unit 220, and a display 222. Here, the controller 200 includes a communication mode controller 202, and the wireless communicator 204 includes a 1X communicator 206 and an EVDO communicator 208.

The controller 200 processes and controls voice and data communications. According to the present invention, the controller 200 includes the communication mode controller 202 to process and control functions of allowing a user to select a communication mode, which is to be performed when using the EVDO data service, so as to operate the portable terminal in the communication mode when an access to the EVDO data service is performed through a key manipulation of the user.

The communication mode controller 202 controls and processes a function of displaying a communication mode setup window on the display 22 when the access to the EVDO data service is performed. The user selects on the communication mode setup window whether the portable terminal operates in a hybrid mode or a data only mode. The hybrid mode supports the EVDO data service and a voice service, and the data only mode supports only the EVDO data service. When the user selects a communication mode through the input unit 220, the communication mode controller 202 requests the wireless communicator 204 to perform an operation corresponding to the selected communication mode. If the communication mode selected by the user is the data only mode, and the access to the EVDO data service stops, the communication mode controller 202 requests the wireless communicator 204 to perform an operation corresponding to the hybrid mode.

The wireless communicator 204 transmits and receives a radio frequency (RF) signal of data input and output through the antenna 210. According to the present invention, the wireless communicator 204 includes the 1X communicator 206 and the EVDO communicator 208 to transmit and receive signals for the voice service and the EVDO data service. In particular, the wireless communicator 204 performs a function of operating in a communication mode requested from the communication mode controller 202. In other words, if an operation corresponding to the data only mode is requested from the communication mode controller 202, the wireless communicator 204 drives only the EVDO communicator 208 to transmit and receive the signal for the EVDO data service.

If the operation corresponding to the hybrid mode is requested from the communication mode controller 202, the wireless communicator 204 transmits and receives the signals for the EVDO data service and the voice service using the EVDO communicator 208 and the 1X communicator 206. If the access to the EVDO data service is performed during the operation corresponding to the hybrid mode, the wireless communicator 204 transmits and receives the signal for the EVDO data service through the EVDO communicator 208. The wireless communicator 204 also periodically stops an operation of the EVDO communicator 208 and drives the 1X communicator 206 to search for a 1X paging channel to determine if the signal for the voice service thereof has been generated. If it is determined that the signal for the voice service has been generated, the wireless communicator 204 receives the signal for the voice service through the 1X communicator 206, stops the operation of the 1X communicator 206, and re-operates the EVDO communicator 208 in order to resume the EVDO data service.

The voice processor 212 is also referred to as a coder-decoder (CODEC), and inputs and outputs a voice signal through the speaker 214 and the microphone 216 which are connected thereto. The image processor 218 is also called an image CODEC, codes an image signal input from the controller 200 using a set method, provides the coded image signal to the controller 200, decodes coded frame image data into an original image, and outputs the original image to the display 222.

The input unit 220 includes a plurality of numerical keys or function keys to provide the controller 200 with data input from the user. In particular, according to the present invention, the input unit 220 receives a key input for selecting the communication mode from the user and provides the key input to the communication mode controller 202. The display 222 displays state information and limited numerical characters which are generated during an operation of the portable terminal. In particular, according to the present invention, the display 222 is controlled by the communication mode controller 202 to display the communication mode setup window for selecting one of the data only mode and the hybrid mode.

Figure 3:
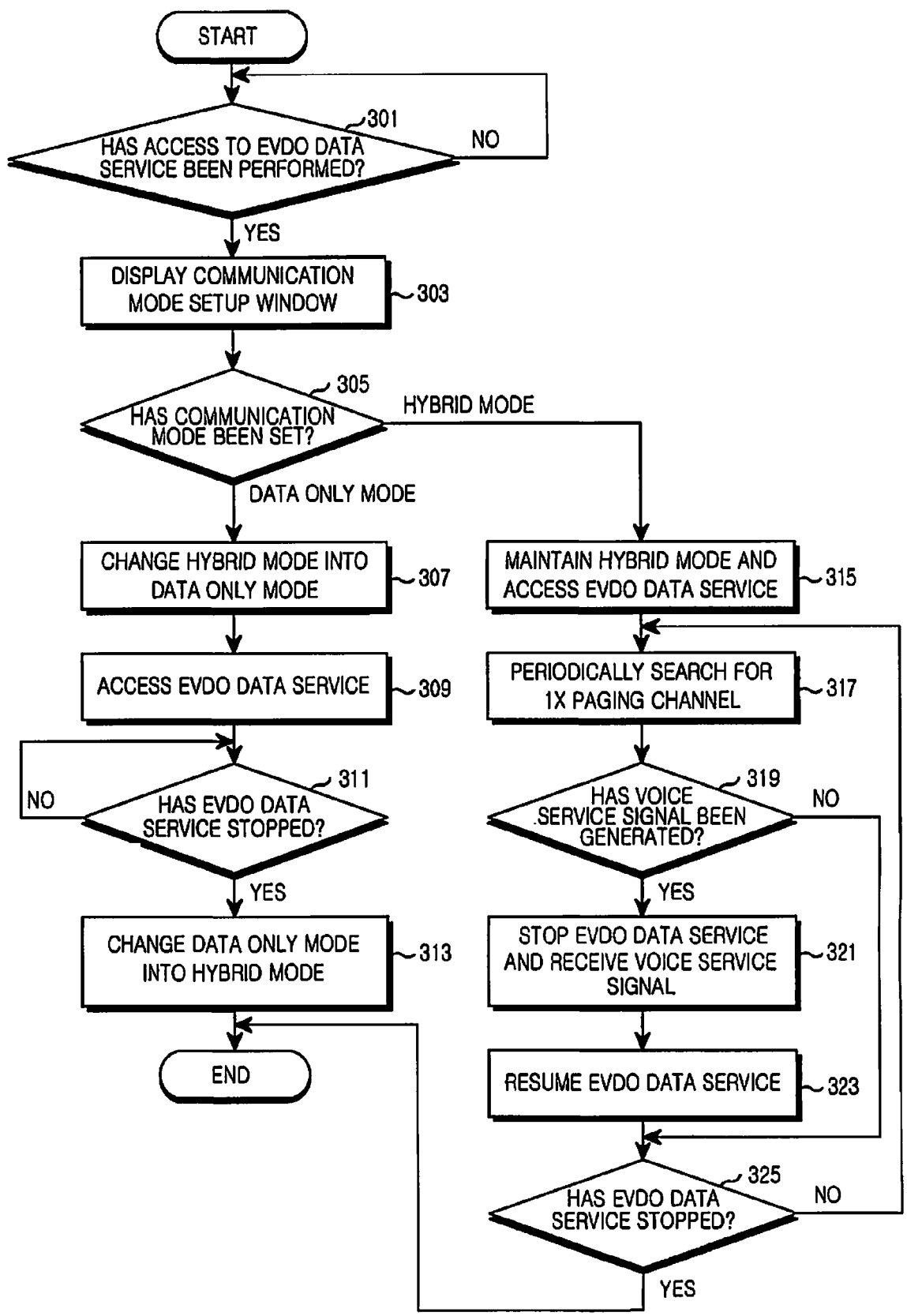
FIG. 3 is a flowchart of a process of using an EVDO data service in a portable terminal according to the present invention.

FIG. 3 is a flowchart of a process of using an EVDO data service in a portable terminal according to the present invention.

Referring to FIG. 3, in step 301, the portable terminal determines if an access to an EVDO data service has been performed. If it is determined in step 301 that the access to the EVDO data service has been performed, the portable terminal proceeds to step 303 to display to a user a communication mode setup window for requesting a selection of one of a data only mode and a hybrid mode. In step 305, the portable terminal determines which one of the data only mode and the hybrid mode has been set through a key manipulation of a user.

If it is determined in step 305 that the data only mode has been set, the portable terminal proceeds to step 307 to change a communication mode set to the hybrid mode, which supports the EVDO data service and a voice service, into the data only mode which supports only the EVDO data service. In step 309, the portable terminal accesses the EVDO data service to receive only an EVDO data service signal. In step 311, the portable terminal determines if an event for stopping the EVDO data service has occurred. If it is determined in step 311 that the event has occurred, the portable terminal proceeds to step 313 to change a communication mode from the data only mode into the hybrid mode, which is a basic mode, and then ends the present process.

If it is determined in step 305 that the hybrid mode has been set, the portable terminal goes to step 315 to maintain the hybrid mode and accesses the EVDO data service. In step 317, the portable terminal periodically searches for a 1X paging channel while accessing the EVDO data service. In step 319, the portable terminal determines if a voice service signal thereof, e.g., a voice call or a short message service (SMS), has been generated. If it is determined in step 319 that the voice service signal has not been generated, the portable terminal goes to step 325. If it is determined in step 319 that the voice service signal has been generated, the portable terminal proceeds to step 321 to pause the EVDO data service and receive the voice service signal. In step 323, the portable terminal resumes the EVDO data service. In step 325, the portable terminal determines if an event for stopping the EVDO data service has occurred. If it is determined in step 325 that the event has not occurred, the portable terminal returns to step 317 to repeat steps subsequent to step 317. If it is determined in step 325 that the event has occurred, the portable terminal ends the present process.

In accordance with the present invention as described above, a communication mode can be set when accessing an EVDO data service in a portable terminal which supports CDMA 2000 1X-EVDO. Thus, the portable terminal can enter a mode, which supports only the EVDO data service, without searching for a 1X paging channel. As a result, efficiency of receiving EVDO data can be improved within a range between 15% and 20% compared to a conventional portable terminal which supports an EVDO data service and a voice service. Also, when accessing the EVDO data service, demands of users who do not desire to be provided with voice services can be satisfied.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of providing a high-speed data service in a portable terminal, which supports a 1X-Evolution Data Only (EVDO) system, comprising:
    initiating an EVDO data service;
    changing a service mode from a hybrid mode to a data only mode;
    accessing the EVDO data service based on the data only mode;
    preventing a search of a 1X paging channel during the accessing of the EVDO data service based on the data only mode; and
    changing from the data only mode to the hybrid mode, upon completion of the EVDO data service based on the data only mode.

2. The method of claim 1, further comprising:
    accessing the EVDO data service based on the data only mode; and
    searching the 1X-EVDO paging channel during the accessing of the EVDO data service based on the hybrid mode.

3. An apparatus for providing a high-speed data service in a portable terminal, which supports a 1X-EVDO system, comprising:
    a controller for receiving a command top change a service mode from a hybrid mode to a data only mode; and
    a wireless communicator for identifying the change from the hybrid mode to the data only mode, accessing an EVDO data service based on the data only mode, determining not to search a 1X paging channel during the accessing of the EVDO data service based on the data only mode, and changing from the data only mode to the hybrid mode, upon completion of the EVDO data service based on the data only mode.

4. The apparatus of claim 3, wherein the wireless communicator comprises:
    an EVDO communicator transmitting and receiving an EVDO data service signal; and
    a 1X communicator transmitting and receiving a voice service signal through the 1X paging channel.

5. The apparatus of claim 3, wherein the wireless communicator searches the 1X paging channel during access to an EVDO data service the hybrid mode.

6. A non-transitory computer-readable recording medium having recorded thereon a program for reducing a paging channel searching time in a portable terminal which supports a hybrid mode and a data only mode, comprising:
    a first code segment, for initiating an EVDO data service;
    a second code segment, for changing a service mode from a hybrid mode to a data only mode;
    a third code segment, for accessing the EVDO data service based on the data only mode;
    a fourth code segment, for preventing a search of a 1X paging channel during the accessing of the EVDO data service based on the data only mode; and
    a fifth code segment, for changing from the data only mode to the hybrid mode, upon completion of the EVDO data service based on the data only mode.

7. An apparatus for a providing a high-speed data service in a portable terminal, which supports a 1X-EVDO system, comprising:
    means for receiving a command to change a service mode from a hybrid mode to a data only mode; and
    means form identifying the change from the hybrid mode to the data only mode, accessing an EVDO data service based on the data only mode, determining not to search a 1X paging channel during the accessing of the EVDO data service based on the data only mode, and changing from the data only mode to the hybrid mode, upon completion of the EVDO data service based on the data only mode.

* * * * *